(12) United States Patent
Williams et al.

(10) Patent No.: US 11,711,138 B1
(45) Date of Patent: *Jul. 25, 2023

(54) MITIGATING SATELLITE INTERFERENCE

(71) Applicant: CABLE TELEVISION LABORATORIES, INC., Louisville, CO (US)

(72) Inventors: Thomas Holtzman Williams, Longmont, CO (US); David Daniel Smith, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/234,280

(22) Filed: Apr. 19, 2021

Related U.S. Application Data

(63) Continuation of application No. 16/780,367, filed on Feb. 3, 2020, now Pat. No. 10,985,832, which is a continuation of application No. 16/155,784, filed on Oct. 9, 2018, now Pat. No. 10,554,292.

(60) Provisional application No. 62/569,308, filed on Oct. 6, 2017, provisional application No. 62/743,079, filed on Oct. 9, 2018.

(51) Int. Cl.
| | |
|---|---|
| *H04B 7/185* | (2006.01) |
| *H04B 1/04* | (2006.01) |
| *H04B 7/155* | (2006.01) |
| *H04B 15/00* | (2006.01) |
| *H04W 16/24* | (2009.01) |

(52) U.S. Cl.
CPC ....... *H04B 7/18513* (2013.01); *H04B 1/0475* (2013.01); *H04B 7/15585* (2013.01); *H04B 15/005* (2013.01); *H04W 16/24* (2013.01); *H04B 2001/0425* (2013.01)

(58) Field of Classification Search
None
See application file for complete search history.

(56) References Cited

U.S. PATENT DOCUMENTS

| | | | | |
|---|---|---|---|---|
| 4,870,422 A | * | 9/1989 | Counselman, III | ..... G01S 19/44 342/450 |
| 4,894,662 A | * | 1/1990 | Counselman | ........... G01S 19/37 342/450 |
| 5,745,386 A | | 4/1998 | Wile et al. | |
| 5,815,794 A | | 9/1998 | Williams | |
| 5,867,764 A | | 2/1999 | Williams | |
| 5,870,513 A | | 2/1999 | Williams | |
| 6,160,990 A | | 12/2000 | Kobayashi et al. | |
| 6,580,336 B1 | | 6/2003 | Gerszberg et al. | |
| 6,880,170 B1 | | 4/2005 | Kauffman et al. | |
| 2003/0058182 A1 | * | 3/2003 | Bhattacharyya | ..... H01Q 13/025 343/786 |
| 2003/0114112 A1 | | 6/2003 | Strater et al. | |

(Continued)

FOREIGN PATENT DOCUMENTS

| | | | | |
|---|---|---|---|---|
| CN | 1750527 A | * | 3/2006 | |
| CN | 102668443 A | * | 9/2012 | ....... H04L 25/03178 |
| WO | WO-2006099443 A1 | * | 9/2006 | ........... H04B 7/1851 |

*Primary Examiner* — Mohammed Rachedine
(74) *Attorney, Agent, or Firm* — Josh C. Snider

(57) ABSTRACT

Mitigation of satellite interference is contemplated. The mitigation may include processing satellite transmissions to remove interferences based on an amount of signal overlap, such as to facilitate mitigating interferences resulting from satellite spacing and/or ground antenna dish size.

20 Claims, 4 Drawing Sheets

(56) References Cited

U.S. PATENT DOCUMENTS

| | | | |
|---|---|---|---|
| 2005/0260948 A1* | 11/2005 | Regulinski | H04B 7/18563 455/12.1 |
| 2007/0169162 A1 | 7/2007 | Kola | |
| 2009/0133095 A1 | 5/2009 | Phillips et al. | |
| 2011/0099601 A1 | 4/2011 | Riggsby et al. | |
| 2012/0027141 A1* | 2/2012 | Petrovic | H04N 21/426 375/350 |
| 2012/0044361 A1 | 2/2012 | Riggsby | |
| 2013/0244481 A1 | 9/2013 | Holland et al. | |
| 2014/0314407 A1 | 10/2014 | Bush et al. | |
| 2016/0218436 A1* | 7/2016 | Rao | H01Q 13/0241 |
| 2016/0278063 A1* | 9/2016 | Zhang | H04W 72/0473 |
| 2017/0353864 A1* | 12/2017 | Bull | H04W 16/10 |
| 2018/0034521 A1* | 2/2018 | Asakura | H04L 9/0858 |
| 2018/0098130 A1 | 4/2018 | Kim | |

\* cited by examiner $$\begin{bmatrix} H11 & H12 \\ H21 & H22 \end{bmatrix} = \begin{bmatrix} .7 & .2 \\ .3 & .8 \end{bmatrix} \rightarrow \begin{bmatrix} h11 & h12 \\ h21 & h22 \end{bmatrix} = \begin{bmatrix} 1.6 & -0.4 \\ -0.6 & 1.4 \end{bmatrix}$$

Fig. 3

$$\begin{bmatrix} A \\ B \end{bmatrix} = \begin{bmatrix} h11 & h12 \\ h21 & h22 \end{bmatrix} \begin{bmatrix} A' + B' \\ A'' + B'' \end{bmatrix} = \begin{bmatrix} \text{Out \#1} \\ \text{Out \#2} \end{bmatrix}$$

Fig. 4

MITIGATING SATELLITE INTERFERENCE

CROSS-REFERENCE TO RELATED APPLICATIONS

This application is a continuation of U.S. patent application Ser. No. 16/780,367, filed Feb. 3, 2020, which application is a continuation of U.S. patent application Ser. No. 16/155,784, filed Oct. 9, 2018, which application claims the benefit of U.S. provisional application No. 62/569,308 filed Oct. 6, 2017 and U.S. provisional application No. 62/743,079 filed Oct. 9, 2018, the disclosures of which are hereby incorporated in their entireties by reference herein.

TECHNICAL FIELD

The present invention relates to mitigation satellite interference, such as but not necessary limiting to mitigation satellite interference resulting from intolerable signal overlap resulting from satellite spacing and/or ground terminal dish size.

BACKGROUND

Constellations of geosynchronous satellites may be used to establish communication systems between each other and/or ground terminals, stations or other devices on the Earth. Satellites may be classified according to altitude, orbit and/or other parameters, with some of the more common classifications including: Low Earth orbit (LEO); Medium Earth orbit (MEO); High Earth orbit (HEO); Semi-synchronous orbit (SSO); Geosynchronous orbit (GEO); Geostationary orbit (GSO) and Areostationary orbit (ASO). In addition to spacing required to avoid physical collisions, satellites may require some amount of orbital spacing or angular spacing to avoid interferences resulting from signals overlapping or otherwise colliding with each other. While some signal overlap may be tolerable under some circumstances, interference of the type sufficient to thwart proper operation may occur when an amount of signal overlap becomes intolerable. The amount of signal overlap needed to produce interference, i.e., intolerable conditions or situations thwarting proper operation, may vary depending on frequency, power, modulation, error correction, polarization and/or other signaling characteristics. The amount of signal overlap needed to produce interference may also vary depending on a size of a dish or a parabolic reflector of the ground terminals as large dishes may operate at smaller degrees of angular spacing than smaller dishes requiring comparatively larger degrees of angular spacing.

The signaling characteristics, dish size and/or the satellite type/classification may influence the amount of angular spacing needed to avoid intolerable signal overlap, e.g., some satellite systems may operate sufficiently with 9° of angular separation where is some other satellite systems may operate sufficiently with 2° of angular separation. As more and more satellites are being deployed, the available satellite spacing, particularly at more crowded locations like the equator, may produce situations where satellites may be unable to maintain a sufficient degree of angular separation relative to ground terminal dish size. One non-limiting aspect of the present invention contemplates mitigating satellite interference resulting from the attendant signal overlap, which may be beneficial in minimizing the amount of angular separation needed between satellites and/or minimizing the dish size of ground terminals.

BRIEF DESCRIPTION OF THE DRAWINGS

FIG. 3 illustrates a diagram of an overlap assessment in accordance with one non-limiting aspect of the present invention.

FIG. 4 illustrates a diagram of an overlap-based relationship in accordance with one non-limiting aspect of the present invention.

FIG. 5 illustrates a system for satellite communications in accordance with one non-limiting aspect of the present invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
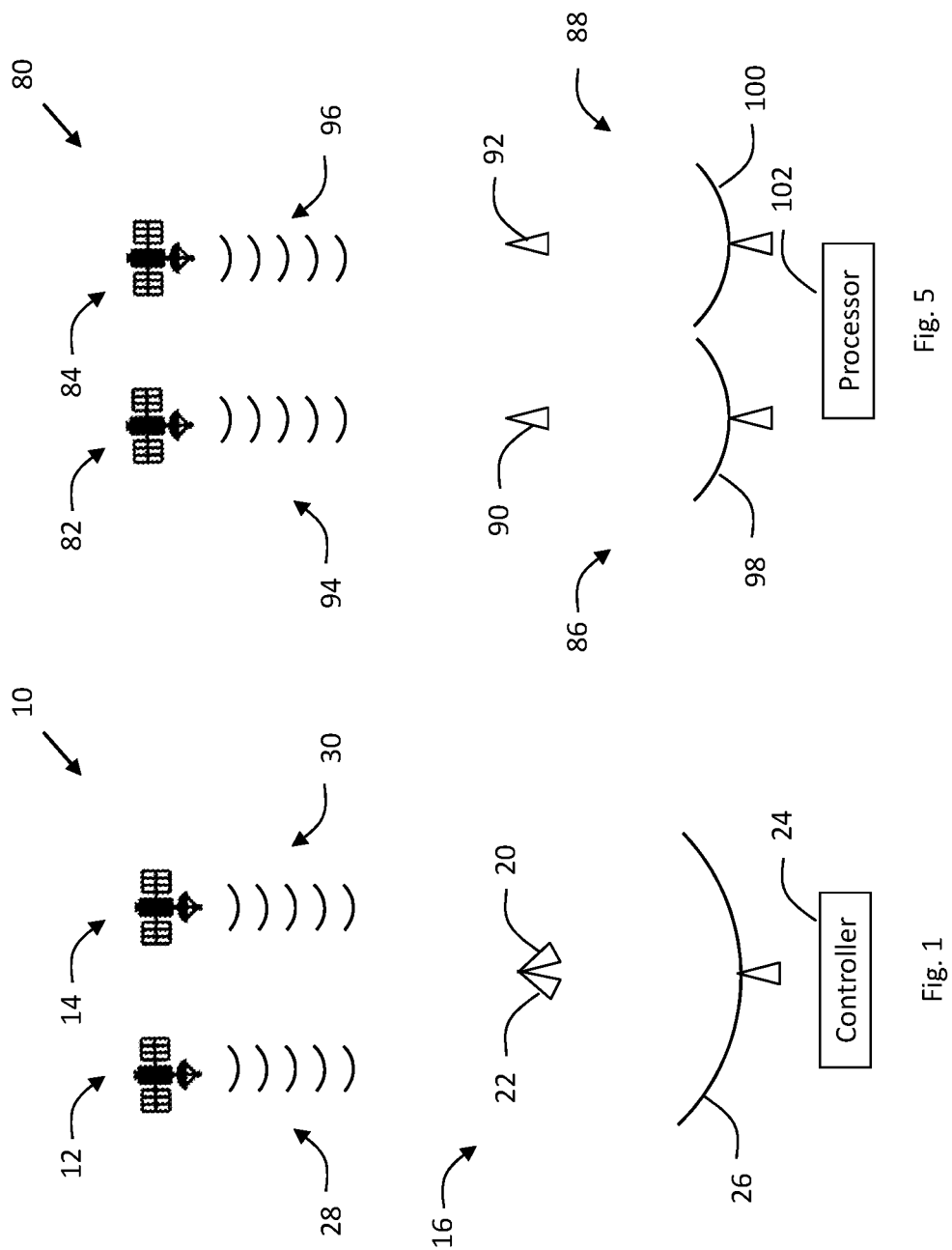
FIG. 1 illustrates a system for satellite communications in accordance with one non-limiting aspect of the present invention.

FIG. 1 illustrates a system 10 for satellite communications in accordance with one non-limiting aspect of the present invention. The system 10 illustrates a constellation of geosynchronous satellites 12, 14 facilitating communications with a ground terminal, station or other device 16 on the Earth. The terminal 16 may include a plurality of antennas 20, 22, which may consist of a feed horn and a low noise amplifier (or low noise block converter) cooperating with a reflector or dish 26 (or other suitable combination of components) to facilitate receiving satellite signals 28, 30. A controller 24 may include capabilities sufficient to facilitate processing, equalizing, inferring or otherwise manipulating satellite signaling received at the antennas 20, 22 into corresponding output signaling. The system 10 illustrates two satellites 12, 14 and two antennas 20, 22 for exemplary purposes as the present invention contemplates its use and application in facilitating satellite communications for any number of satellites and any number terminals, including those associated with any type or classification of stationary or moving satellite and any type or classification of stationary or movable terminal, such as but not necessarily limited to satellites and terminals sufficient to facilitate satellite communications associated with Low Earth orbit (LEO); Medium Earth orbit (MEO); High Earth orbit (HEO); Semi-synchronous orbit (SSO); Geosynchronous orbit (GEO); Geostationary orbit (GSO) and Areostationary orbit (ASO). One non-limiting aspect of the present invention contemplates the controller 24 operating in concert with the satellites 12, 14 and/or the terminal 16 to facilitate mitigating satellite interference resulting from signal overlap, which may be beneficial in minimizing the amount of angular separation needed between the satellites and/or minimizing the dish size of the terminal.

Figure 2:
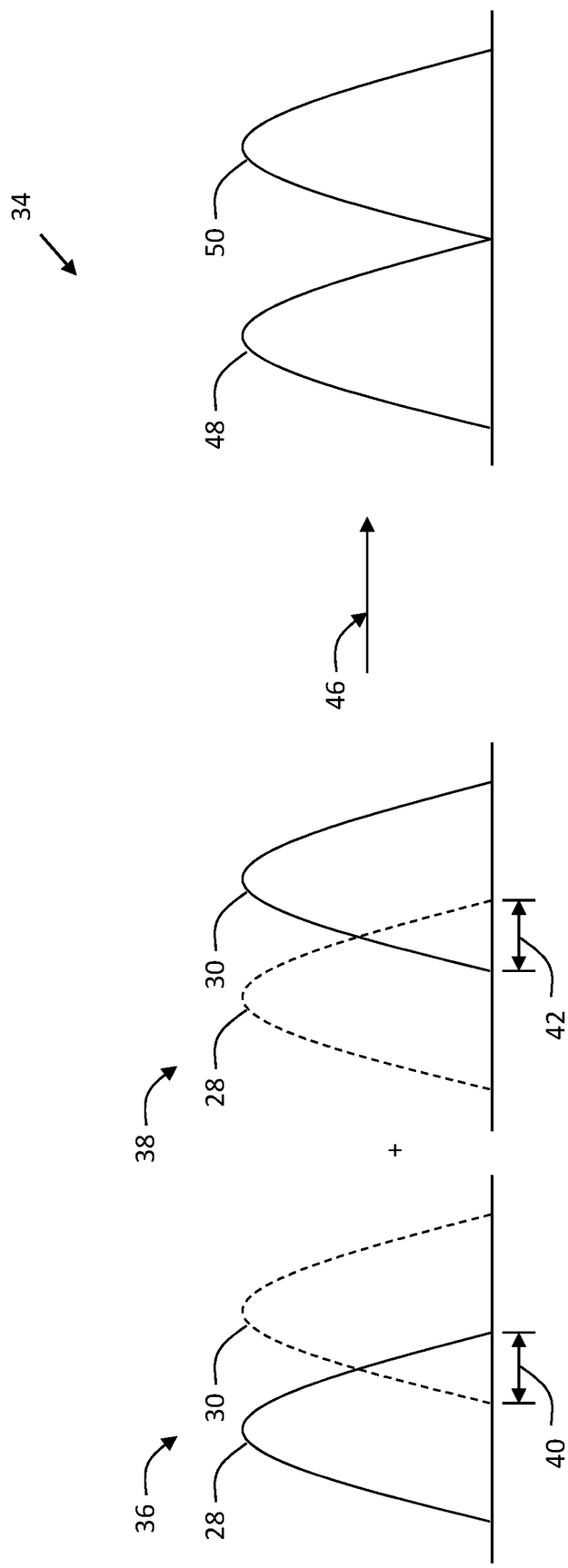
FIG. 2 schematically illustrates a diagram for the mitigation of satellite interference in accordance with one non-limiting aspect of the present invention.

FIG. 2 schematically illustrates a diagram 34 for the mitigation of satellite interference in accordance with one non-limiting aspect of the present invention. The diagram illustrates signaling 36 received at the first antenna 20 and signaling 38 received at the second antenna 22 following transmission of the first and second signals 28, 30. The received signaling 36, 38 may include interference resulting from the first and second satellites 12, 14 overlapping to a degree sufficient to cause the signaling 36, 38 received at the first and second antennas 20, 22 to each include an overlap 40, 42. The first and second satellites 12, 14 may be considered to be overlapping when signaling associated therewith collides or otherwise overlap or interfere with each other before being received at the antennas 20, 22. The signaling 36 received at the first antenna 20 consequently may include a portion of the first signal 28 and a portion of the second signal 30, and the signaling 38 received at the second antenna 22 may include a portion of the first signal 28 and a portion of the second signal 30. In the event the first signal 28 is intended for receipt at the first antenna 20 and the second signal 30 is intended for receipt at the second antenna 22, an intolerable amount of the overlap 40,42 may result from the first antenna 20 receiving too much of the second signal 30 and the second antenna 22 receiving too much of the first signal 28. The amount of the overlap 40,42 needed to produce an intolerable level of interference may vary depending on frequency, power, modulation, error correction, polarization and/or other characteristics of the first and second signals and/or a size of the parabolic reflector. The signaling characteristics, dish size and/or the satellite type/classification may correspondingly influence an amount of angular spacing needed to avoid such intolerable signal overlap 40,42, e.g., some satellite systems may operate sufficiently with 9° of angular separation where is some other satellite systems may operate sufficiently with 2° of angular separation.

The diagram illustrates a threshold of interference being surpassed due to some combination of the signaling characteristics, dish size, satellite type/classification and/or angular spacing resulting in an intolerable amount of the overlap 40,42. A mitigation process 46 contemplated by the present invention may be utilized to remove or ameliorate the interference to a level sufficient for corresponding output signaling 48, 50 to approximate the signals 28, 30 as originally transmitted from the satellites 12, 14. One non-limiting aspect of the present invention contemplates the mitigation process 46 assessing the signaling 36 received at the first antenna 20 with the signaling 38 received at the second antenna 22 to generate the output signaling 48, 50 having the interference removed or ameliorated, i.e., a first output 48 representing the first signal 28 and a second output 50 representing the second signal 30. The mitigation process 46 may be facilitated by the controller 24 utilizing the amount of the overlap 40,42 to coordinate processing of the received signaling 36, 38 into the output signaling 48, 50. One non-limiting aspect of the present invention contemplates assessing the amount of the overlap 40,42 according to signal responses measured or estimated at the antennas 20, 22 for communications associated with the satellites 12, 14, e.g., generating relatively quantified values or normalized values sufficient to represent the signal responses. The values representing the signaling responses may be derived from a testing process whereby test signals transmitted from the first and second satellites 12, 14 may be measured at the first and second antennas 20, 22, e.g. each satellite 12, 14 may take turns transmitting test signals with the other satellites 12, 14 are dormant. The values representing the signaling responses may also be blindly derived, i.e., without the testing process measurements, from a statistical analysis modulation error ratio (MER) or other characteristics of the satellites 12, 14 and/or the antennas 20, 22.

FIG. 3 illustrates a diagram 56 of an overlap assessment in accordance with one non-limiting aspect of the present invention. The overlap assessment may include generating a matrix 58 of an M×N m type having M number of rows and N number of columns to represent the values associated with the signal responses used to assess the overlap 40,42. M may correspond with a quantity of satellites 12, 14 and N may correspond with a quantity of antennas 20, 22 such that cell values for each cell within the matrix 58 represents a corresponding signal response of one of the antennas 20, 22. In the exemplary description where the first and second satellites 12, 14 facilitate communications with the first and second antennas 20, 22, the matrix may be 2×2 where a first row 60 represents signaling responses for the first antenna 20 and a second row 62 represents signaling responses for the second antenna. In the event the signaling responses may be determined according to the testing process, i.e., as a function of test signals transmitted from the, the cell value for H11 may represent the signal response at the first antenna 20 when only the first satellite 12 transmits the test signal, the cell value for H12 may represent the signal response at the first antenna 20 when only the second satellite 14 transmits the test signaling, the cell value for H21 may represent the signal response at the second antenna 22 when only the first satellite 12 transmits the test signaling, and the cell value for H22 may represent the signal response at the second antenna 22 when only the second satellite transmits the test signaling 14. The cell values, i.e. coefficients representing the signal responses may be complex numbers but are shown as real values for the sake of illustration.

The cell values may be represented as floating point real and imaginary, or as magnitude and angle or other scaling to relatively quantify the signaling responses at the antennas 20, 22 as numerical values. The numerical values may be sufficient for mathematically computing an influence (channel response) of the second satellite 14 on communications between the first satellite 12 and the first antenna 20 and an influence of the first satellite 12 on communications between the second satellite 14 and the second antenna 22. The numerical representations of the signal responses may be used in this manner to facilitate an interference related quantification of the signaling 36 received at the first antenna 20 including a portion of the first signal 28 and a portion of the second signal 30 and the signaling 38 received at the second antenna 22 including a portion of the first signal 28 and a portion of the second signal 30. The contemplated matrix-based assessment of the overlap may be utilized with any number of satellites and antennas, such as to facilitate tabulating signal responses when three or more satellites overlappingly communicate with a corresponding quantity of antennas, i.e., matrices of 3×3, 4×4, etc. The controller 24 may employ linear algebra to calculate an inverse matrix 64 of the matrix 58 suitable for use with matrix multiplication to establish a relationship based on the amount of the overlap 40,42 between the signaling transmitted from the satellites 12, 14 and the signaling 36, 38 received at the antennas 20, 22.

FIG. 4 illustrates a diagram 68 of an overlap-based relationship between the signaling transmitted from the satellites and the signaling received at the antennas 20, 22 in accordance with one non-limiting aspect of the present invention. The relationship may be based on linear algebra principles whereby the first and second output signals 48, 50

(Out #1, Out #2) may be determined as a product of the inverse matrix 64 and the signals 36 received at the first antenna (A'+B') and the signals 38 received at the second antenna (A"+B") to represent the signaling 28, 30 transmitted from the first satellite (A) and the signaling transmitted from the second satellite (B). The controller 24 may implement an equalization process or other signal manipulation based on a product of the inverse matrix 64 and the signaling 36, 38 received at the antennas 20, 22 to generate the output signaling 48, 50 with the interference resulting from the overlap 40,42 being mitigated, i.e., eliminated or ameliorated. By generating the matrix 58 as a function of the signal responses at the antennas 20, 22, i.e., developing a mathematical relationship between the overlap 40,42 and the attendant interference, the corresponding inverse matrix 64 may then be used through matrix multiplication to effectively remove the corresponding interference from the signaling 36, 38 received at the antennas 20, 22. The output signals 48, 50 may in this manner correspondingly produce as sufficient representation of the satellite signals 28, 30 as if the signals 28, 30 were received at the antennas 20, 22 without the interference associated with the overlapping signaling.

The capability of the present invention to equalize the signaling received at the antennas using mathematical principles may be beneficial in facilitating satellite communications when multiple satellites have overlapping signaling, footprints, antenna patterns, etc. This capability may enable satellite communications to occur when an angular spacing between the satellites would otherwise produce intolerable levels of interference and/or when a size of the parabolic reflector would otherwise produce intolerable levels of interference, i.e., the present invention enables a smaller dish size to be used when a larger dish size would otherwise be required to avoid the interference. The foregoing capabilities may also be beneficial in accounting for movement of the satellites, such as when orbital paths of the satellites vary over time to change the amount of the overlap, as corresponding adjusting the values in the matrix can be made to account for satellite movement. The matrix may also be adjusted or updated to account for some types of ground terminals being configured to move or adjust their location/angular position relative to one or more satellites. Such antennas may optionally remain stationary and account for the overlap created by the lack of antenna movement using the mitigation interference mitigation contemplated herein to instead track the related satellite movement. The capability of the present invention to mathematically mitigate noise may provide a less complex process for thwarting satellite interference than other interference avoidance techniques, such as those requiring beam steering or spatial, frequency and/or temporal management.

FIG. 5 illustrates a system 80 for satellite communications in accordance with one non-limiting aspect of the present invention. The system 80 illustrates a constellation of geosynchronous satellites 82, 84, which may operate the similarly to the satellites 12, 14 described in FIG. 1 to facilitate communications with multiple terminals 86, 88. Each terminal 86, 88 may include an antenna 90, 92 to facilitate receiving satellites signals 94, 96 reflecting off of non-shared parabolic reflectors 98, 100. A controller 102, which may operate the same as the controller described in the FIG. 1, may include capabilities sufficient to facilitate processing, equalizing, inferring or otherwise manipulating satellite signaling received at the antennas 90, 92 into corresponding output signaling having mitigated interference. The parabolic reflectors 98, 100 may be smaller than the parabolic reflector 26 in FIG. 1 to illustrate one non-limiting aspect of the present invention whereby the interference mitigation described herein may be useful in enabling parabolic reflectors of a smaller size to used. Additional systems or configurations, i.e., those employing more or different configurations than that illustrated in FIGS. 1 and 5, may employ the interference mitigation described herein without deviating from the scope and contemplation of the present invention.

Figure 6:
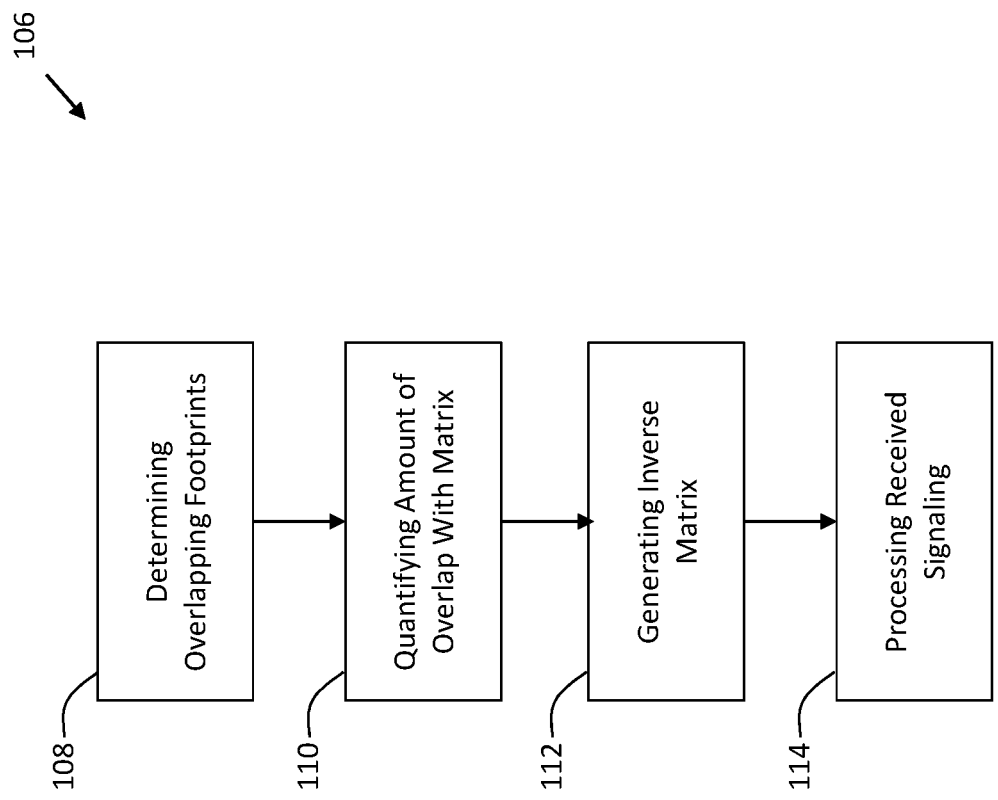
FIG. 6 illustrates a flowchart of a method for mitigating satellite interference in accordance with one non-limiting aspect of the present invention.

FIG. 6 illustrates a flowchart 106 of a method for mitigating satellite interference in accordance with one non-limiting aspect of the present invention. The method and associated processes may be facilitated with execution of a plurality of non-transitory instructions stored on a non-transitory computer readable medium, such as with a processor included on the controller or other device capable of facilitating the operations contemplated herein. The contemplated mitigation may be beneficial in eliminating or ameliorating interference in signals transmitted between devices and is described for exemplary non-limiting purposes with respect to the signaling being associated with multiple satellites communicating in an overlapping manner. The method may be utilized to enable satellites to properly function when an overlap would otherwise provide intolerable levels interference for receiving antennas. The capability to facilitate satellite communications when satellites may be permanently and/or periodically positioned relative to other satellites may be beneficial in enabling more satellites to the deployed closer to each other and/or to enable the use of smaller dish sizes.

Block 108 relates to determining overlapping patterns, footprints, etc. for satellite desiring to transmit signaling to ground terminals or other devices. Overlapping signaling, patterns, footprints and/or other position-dependent interference may be determined as a function of orbital movements of the satellites and/or as a result of the satellites being stationary at spacing creating overlap. In the event satellites are non-stationary or have orbital paths that cause them to have be periodically overlapping, Block 108 may relate to continuously checking or updating the overlap determination in order to assess whether the contemplated mitigation may be necessary, e.g., the mitigation process may be turned on and off as needed depending on when the satellites may be overlapping. Block 110 relates to quantifying the overlap determining Block 108 within a matrix, such as according to the above-described matrix whereby cell values represent signaling responses of antennas receiving the overlapping signaling. The matrix may be of the described M×N type such that a number cells in the matrix may be related to a number of unknowns in the received signaling to establish a relationship sufficient for mitigating interference in the received signaling. Block 112 relates to generating an inverse matrix for the matrix determined in Block 110, such as with use of Gaussian elimination, Newton's method, Cayley-Hamilton method, Eigendecomposition, Cholesky decomposition, etc. Block 114 relates to mitigating interference in received signaling with a signal processor or other equalizer generating outputs as a product of the received signaling and the inverse matrix.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A satellite system, comprising:
    a first antenna receiving unit and a second antenna receiving unit configured to receive first and second signaling from a first satellite and a second satellite, respectively, orbiting Earth; and
    a signal processor configured to process the received first and second signaling to mitigate interference from a signaling overlap between the first and second signaling from the first and second satellites.

2. The system of claim 1, wherein first and second antenna receiving units are controlled by a single controller.

3. The system of claim 2, wherein the first and second antenna receiving units are configured with an access network communicate in operable communication with a central control system.

4. The system of claim 1, wherein at least one of the first and second satellites is a Low Earth Orbit (LEO) satellite.

5. The system of claim 1, wherein the first and second antenna receiving units are configured with a single terminal.

6. The system of claim 5, wherein the first and second antenna receiving units include first and second feed horns, respectively.

7. The system of claim 1, wherein the first and second antenna receiving units are configured with a plurality of terminals.

8. The system of claim 7, wherein the first and second antenna receiving units are cooperatively configured to minimize the size of each antennas in the plurality of antennas respectively associated with the first and second antenna receiving units.

9. The system of claim 1, wherein the signal processor is configured to mitigate the interference according to an equalization process whereby output signaling is generated as a product of the received signaling and an inverse matrix, and wherein the inverse matrix is generated based on a quantification of the signaling overlap.

10. The system of claim 9, wherein the signal processor is further configured to generate the inverse matrix from a matrix generated as part of a testing process configured to generate the matrix by assessing signaling responses at the first and second antenna receiving units to test signaling transmitted from the of first and second satellites.

11. The system of claim 9, wherein the signal processor is further configured to generate the inverse matrix from a matrix generated as part of a statistical analysis modulation error ratio (MER) configured to generate the matrix by blindly estimating signaling responses at the first and second antenna receiving units.

12. The system of claim 1, wherein the signal processor is further configured to mitigate the interference according to an equalization process whereby an output signaling is generated as a product of the received first and second signaling and a mathematical relationship, wherein the mathematical relationship represents an overlap between the first and second signaling from the first and second satellites.

13. The system of claim 1, wherein at least one of the first and second satellites is a satellite classified as one of (i) a Medium Earth orbit (MEO), (ii) a High Earth orbit (HEO), (iii) a Semi-synchronous orbit (SSO), (iv) a Geosynchronous orbit (GEO), (v) a Geostationary orbit (GSO), and (vi) an Areostationary orbit (ASO).

14. The system of claim 1, wherein at least one of the first and second satellites is a satellite classified as one of (i) a stationary terminal, and (ii) a moveable terminal.

15. An apparatus for a satellite system, comprising:
    a processor; and
    a memory device in communication with the processor and configured to store computer-executable instructions therein, which, when executed by the processor, cause the processor to:
        receive, from a first antenna receiving unit, a first signal from a first satellite;
        receive, from a second antenna receiving unit proximate the first antenna receiving unit, a second signal from a second satellite; and
        process the received first and second signals together to mitigate interference arising from a signaling overlap between the first and second signals from the first and second satellites.

16. The apparatus of claim 15, wherein at least one of the first and second antenna receiving units includes a feed horn configured to cooperate with a low noise amplifier (LNA) and a satellite station reflector.

17. The apparatus of claim 15, wherein at least one of the first and second satellites is a stationary terminal, a moveable terminal, or a satellite classified for one of (i) a Medium Earth orbit (MEO), (ii) a High Earth orbit (HEO), (iii) a Semi-synchronous orbit (SSO), (iv) a Geosynchronous orbit (GEO), (v) a Geostationary orbit (GSO), (vi) an Areostationary orbit (ASO), and (vii) a Low Earth orbit (LEO).

18. The apparatus of claim 15, wherein the processor is configured for operable communication with an access network including a central control system.

19. The apparatus of claim 15, wherein the instructions further cause the processor to (i) mitigate the interference according to an equalization process, (ii) generate a signaling output as a product of the received first and second signals and an inverse matrix generated based on a quantification of the signaling overlap.

20. The apparatus of claim 19, wherein the instructions further cause the processor to generate the inverse matrix from at least one of (a) a testing subprocess configured to generate a matrix by assessing signaling responses at the first and second antenna receiving units of the first and second signals transmitted from the first and second satellites, (b) a statistical analysis modulation error ratio (MER) subprocess configured to generate a matrix by blindly estimating signaling responses at the first and second antenna receiving units, and (c) an equalization subprocess configured to generate the signaling output as a product of the received first and second signals and a mathematical relationship representing an overlap between the first and second signals from the first and second satellites.

* * * * *